United States Patent
Ju et al.

(10) Patent No.: US 11,367,871 B2
(45) Date of Patent: Jun. 21, 2022

(54) POSITIVE ELECTRODE ACTIVE MATERIAL FOR SECONDARY BATTERY AND LITHIUM SECONDARY BATTERY INCLUDING THE SAME

(71) Applicant: LG Chem, Ltd., Seoul (KR)

(72) Inventors: In Seong Ju, Daejeon (KR); Wang Mo Jung, Daejeon (KR); Byung Chun Park, Daejeon (KR); Joo Hong Jin, Daejeon (KR); Ju Kyung Shin, Daejeon (KR); Ji Hye Kim, Daejeon (KR); So Ra Baek, Daejeon (KR); Tae Gu Yoo, Daejeon (KR)

(73) Assignee: LG Energy Solution, Ltd.

( * ) Notice: Subject to any disclaimer, the term of this patent is extended or adjusted under 35 U.S.C. 154(b) by 300 days.

(21) Appl. No.: 16/485,307

(22) PCT Filed: Sep. 19, 2018

(86) PCT No.: PCT/KR2018/011080
§ 371 (c)(1),
(2) Date: Aug. 12, 2019

(87) PCT Pub. No.: WO2019/059653
PCT Pub. Date: Mar. 28, 2019

(65) Prior Publication Data
US 2020/0028168 A1    Jan. 23, 2020

(30) Foreign Application Priority Data

Sep. 19, 2017  (KR) .................. 10-2017-0120680
Sep. 19, 2018  (KR) .................. 10-2018-0112198

(51) Int. Cl.
*H01M 4/505*   (2010.01)
*H01M 4/36*    (2006.01)
(Continued)

(52) U.S. Cl.
CPC ........... *H01M 4/505* (2013.01); *H01M 4/366* (2013.01); *H01M 4/525* (2013.01); *H01M 4/62* (2013.01);
(Continued)

(58) Field of Classification Search
CPC ........ H01M 4/366; H01M 4/505; H01M 4/62; H01M 10/0525; H01M 2004/021; H01M 2004/028; H01M 4/525
See application file for complete search history.

(56) References Cited

U.S. PATENT DOCUMENTS

2002/0119372 A1    8/2002  Zhang
2002/0119375 A1 *  8/2002  Zhang ............... H01M 10/0569
                                                           429/232
(Continued)

FOREIGN PATENT DOCUMENTS

CN    104781960 A    7/2015
CN    106797049 A    5/2017
(Continued)

OTHER PUBLICATIONS

International Search Report for PCT/KR2018/011080 dated Dec. 19, 2018.
(Continued)

*Primary Examiner* — Cynthia H Kelly
*Assistant Examiner* — Aaron J Greso
(74) *Attorney, Agent, or Firm* — Lerner, David, Littenberg, Krumholz & Mentlik, LLP

(57) ABSTRACT

The present invention provides a positive electrode active material for a secondary battery which includes a lithium transition metal oxide, wherein the positive electrode active material has three peaks in a differential graph (ERC curve) obtained by differentiating a pH value against an amount of acid (HCl) added, which is obtained by pH titration of 10 g
(Continued)

of the lithium transition metal oxide using 0.5 M HCl, wherein a y-axis (dpH/dml) value of a first peak at the smallest x-axis value among the three peaks is −1.0 or less.

9 Claims, 2 Drawing Sheets

(51) Int. Cl.
    *H01M 4/525*     (2010.01)
    *H01M 4/62*     (2006.01)
    *H01M 10/0525*     (2010.01)
    *H01M 4/02*     (2006.01)

(52) U.S. Cl.
    CPC .. *H01M 10/0525* (2013.01); *H01M 2004/021* (2013.01); *H01M 2004/028* (2013.01)

(56) References Cited

U.S. PATENT DOCUMENTS

| | | | |
|---|---|---|---|
| 2013/0277604 A1 | 10/2013 | Shimokita et al. | |
| 2014/0308572 A1 | 10/2014 | Tsuchida et al. | |
| 2015/0037678 A1 | 2/2015 | Kwak et al. | |
| 2016/0013476 A1* | 1/2016 | Oh | H01M 4/131 429/223 |
| 2017/0179470 A1 | 6/2017 | Choi et al. | |
| 2017/0317342 A1 | 11/2017 | Kang et al. | |
| 2018/0097227 A1 | 4/2018 | Natsui et al. | |
| 2018/0131006 A1 | 5/2018 | Kokubu et al. | |

FOREIGN PATENT DOCUMENTS

| | | | | |
|---|---|---|---|---|
| EP | 2463942 A1 | 6/2012 | | |
| JP | H09115515 A | 5/1997 | | |
| JP | 2009536436 A | 10/2009 | | |
| JP | 2010040382 A | 2/2010 | | |
| JP | 2013239434 A | 11/2013 | | |
| JP | 2015536558 A | 12/2015 | | |
| KR | 20100096750 A | 9/2010 | | |
| KR | 20150013077 A | 2/2015 | | |
| KR | 20150049288 A | 5/2015 | | |
| KR | 20150050458 | * | 5/2015 | ............ H01M 4/485 |
| KR | 20150050458 A | 5/2015 | | |
| KR | 20150074744 A | 7/2015 | | |
| KR | 20170076088 A | 7/2017 | | |
| WO | 2007129848 A1 | 11/2007 | | |
| WO | 2017047022 A1 | 3/2017 | | |
| WO | 2017056364 A1 | 4/2017 | | |
| WO | 2017150914 A1 | 9/2017 | | |

OTHER PUBLICATIONS

Extended European Search Report with Written Opinion for Application No. 18858676.2 dated Mar. 4, 2020, 6 pages.

* cited by examiner

POSITIVE ELECTRODE ACTIVE MATERIAL FOR SECONDARY BATTERY AND LITHIUM SECONDARY BATTERY INCLUDING THE SAME

CROSS-REFERENCE TO RELATED APPLICATIONS

This application is a national phase entry under 35 U.S.C. § 371 of International Application No. PCT/2018/011080, filed Sep. 19, 2018, which claims priority to Korean Patent Application Nos. 10-2017-0120680, filed Sep. 19, 2017, and Korean Patent Application No. 10-2018-0112198, filed Sep. 19, 2018, the disclosures of which are incorporated herein in their entirety by reference.

CROSS-REFERENCE TO RELATED APPLICATIONS

This application claims the benefit of Korean Patent Application Nos. 10-2017-0120680, filed on Sep. 19, 2017, and 10-2018-0112198, filed on Sep. 19, 2018, in the Korean Intellectual Property Office, the disclosure of which is incorporated herein in its entirety by reference.

TECHNICAL FIELD

The present invention relates to a positive electrode active material for a secondary battery, and a positive electrode and a lithium secondary battery which include the same.

BACKGROUND ART

Recently, with the rapid spread of electronic devices using batteries, such as mobile phones, notebook computers, and electric vehicles, demand for secondary batteries with relatively high capacity as well as small size and lightweight has been rapidly increased. Particularly, since a lithium secondary battery is lightweight and has high energy density, the lithium secondary battery is in the spotlight as a driving power source for portable devices. Accordingly, research and development efforts for improving the performance of the lithium secondary battery have been actively conducted.

In the lithium secondary battery in a state in which an organic electrolyte solution or a polymer electrolyte solution is filled between a positive electrode and a negative electrode which are respectively formed of active materials capable of intercalating and deintercalating lithium ions, electrical energy is produced by oxidation and reduction reactions when the lithium ions are intercalated/deintercalated into/from the positive electrode and the negative electrode.

Lithium cobalt oxide ($LiCoO_2$), lithium nickel oxide ($LiNiO_2$), lithium manganese oxide ($LiMnO_2$ or $LiMn_2O_4$, etc.), and a lithium iron phosphate compound ($LiFePO_4$) are mainly used as a positive electrode active material of the lithium secondary battery. Also, as a method to improve low thermal stability while maintaining excellent reversible capacity of the $LiNiO_2$, a method of substituting a portion of nickel (Ni) with cobalt (Co) or manganese (Mn) has been proposed. However, with respect to $LiNi_{1-\alpha}Co_\alpha O_2$ ($\alpha$=0.1 to 0.3) in which a portion of nickel is substituted with cobalt, it exhibits excellent charge and discharge characteristics and life characteristics, but thermal stability is low. Furthermore, with respect to a nickel manganese-based lithium composite metal oxide, in which a portion of nickel (Ni) is substituted with manganese (Mn) having excellent thermal stability, and a nickel cobalt manganese-based lithium composite metal oxide (hereinafter, simply referred to as "NCM-based lithium oxide") in which a portion of nickel is substituted with manganese (Mn) and cobalt (Co), output characteristics are low and there is a risk of dissolution of metallic elements and the resulting battery characteristic degradation. Also, for high energy density, research into increasing an amount of Ni in the NCM-based lithium oxide has been conducted, but, with respect to a high Ni-content NCM-based lithium oxide, cycle characteristics are rapidly degraded during long-term use, and limitations, such as swelling due to the generation of gas in the battery and low chemical stability, have not been sufficiently addressed.

Thus, it is necessary to search for a method of developing a new positive electrode active material which may further increase discharge capacity of the lithium secondary battery, may reduce resistance, and may improve output characteristics and cycle characteristics.

DISCLOSURE OF THE INVENTION

Technical Problem

An aspect of the present invention provides a positive electrode active material for a secondary battery which may secure excellent chemical and thermal stability and excellent life characteristics while achieving high capacity and high output due to excellent charge and discharge characteristics.

Technical Solution

According to an aspect of the present invention, there is provided a positive electrode active material for a secondary battery which includes a lithium transition metal oxide, wherein the positive electrode active material has three peaks in a differential graph (ERC curve) obtained by differentiating a pH value against an amount of acid (HCl) added, which is obtained by pH titration of 10 g of the lithium transition metal oxide using 0.5 M HCl, wherein a y-axis (dpH/dml) value of the peak at the smallest x-axis value among the three peaks is −1.0 or less.

According to another aspect of the present invention, there is provided a positive electrode and a lithium secondary battery which include the positive electrode active material.

Advantageous Effects

A positive electrode active material for a secondary battery according to the present invention may secure excellent chemical and thermal stability and excellent life characteristics while achieving high capacity and high output due to excellent charge and discharge characteristics.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
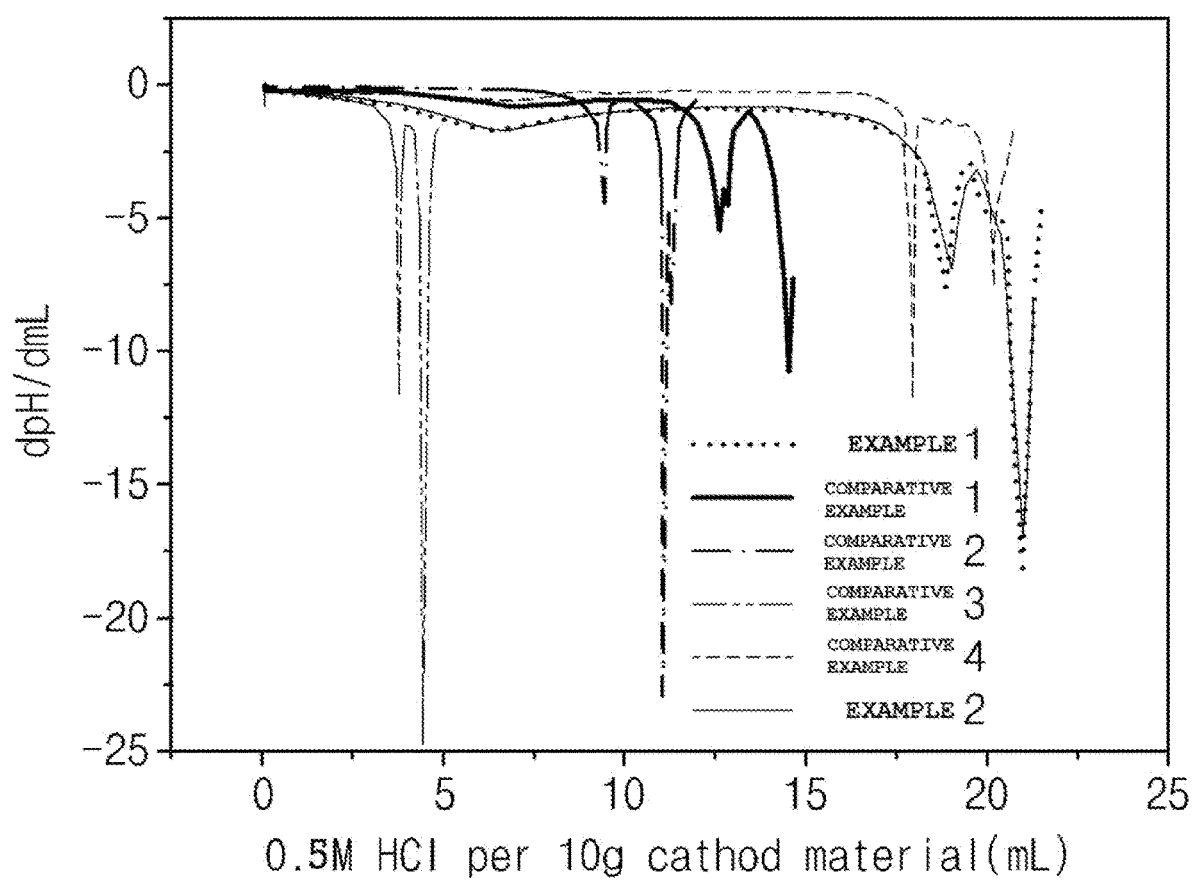
FIG. 1 is a graph analyzing positive electrode active materials prepared according to Examples and Comparative Examples by pH titration.

Hereinafter, the present invention will be described in more detail to allow for a clearer understanding of the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

A positive electrode active material for a secondary battery of the present invention includes a lithium transition metal oxide and has three peaks in a differential graph (ERC curve) obtained by differentiating a pH value against an amount of acid (HCl) added, which is obtained by pH titration of 10 g of the lithium transition metal oxide using 0.5 M HCl, wherein a y-axis (dpH/dml) value of the peak at the smallest x-axis value among the three peaks is −1.0 or less.

As described above, the positive electrode active material, which has three peaks in the differential graph (ERC curve) based on pH titration analysis and satisfies a condition that the y-axis (dpH/dml) value of the first peak is −1.0 or less, may secure excellent chemical and thermal stability and excellent life characteristics while achieving high capacity and high output due to excellent charge and discharge characteristics.

A lithium transition metal oxide typically used as a positive electrode active material may be used as the above lithium transition metal oxide, and a lithium transition metal oxide, which includes at least one transition metal cation selected from the group consisting of nickel (Ni), cobalt (Co), and manganese (Mn), may be more preferably used. For example, the positive electrode active material may include a layered compound, such as lithium cobalt oxide ($LiCoO_2$) or lithium nickel oxide ($LiNiO_2$), lithium manganese oxides such as $Li_{1+x1}Mn_{2-x1}O_4$ (where x1 is 0 to 0.33), $LiMnO_3$, $LiMn_2O_3$, and $LiMnO_2$, Ni-site type lithium nickel oxide expressed by a chemical formula of $LiNi_{1-x2}M1_{x2}O_2$ (where M1=Co, Mn, aluminum (Al), copper (Cu), iron (Fe), magnesium (Mg), boron (B), or gallium (Ga), and x2=0.01 to 0.3), lithium manganese composite oxide expressed by a chemical formula of $LiMn_{2-x3}M2_{x3}O_2$ (where M2=Co, Ni, Fe, chromium (Cr), zinc (Zn), or tantalum (Ta), and x3=0.01 to 0.1) or $Li_2Mn_3MO_3$ (where M3=Fe, Co, Ni, Cu, or Zn), spinel-structured lithium manganese composite oxide expressed by $LiNi_{x4}Mn_{2-x4}O_4$ (where x4=0.01 to 1), and a lithium iron phosphate compound ($LiFePO_4$), but the positive electrode active material is not limited thereto.

Also, a lithium transition metal composite oxide represented by the following Formula 1 may be included as the positive electrode active material.

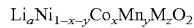

$$Li_aNi_{1-x-y}Co_xMn_yM_zO_2 \quad \text{[Formula 1]}$$

In Formula 1, M is at least one element selected from the group consisting of Al, zirconium (Zr), titanium (Ti), Mg, Ta, niobium (Nb), molybdenum (Mo), and Cr, 0.9≤a≤1.5, 0≤x≤0.5, 0≤y≤0.5, and 0≤z≤0.1.

The positive electrode active material may more preferably include at least one selected from the group consisting of a lithium cobalt oxide ($LiCoO_2$), a lithium nickel oxide ($LiNiO_2$), a lithium manganese oxide ($LiMn_2O_4$), a lithium iron phosphate compound ($LiFePO_4$), and the lithium transition metal composite oxide represented by Formula 1.

The lithium transition metal composite oxide represented by Formula 1 may be a high nickel-based lithium transition metal composite oxide in which an amount of nickel (Ni) among total transition metals in the lithium transition metal composite oxide is 60 mol % or more.

Specifically, in the lithium transition metal composite oxide of Formula 1, lithium (Li) may be included in an amount corresponding to a, that is, 0.9≤a≤1.5. When a is less than 0.9, capacity may be reduced, and, when a is greater than 1.5, since particles are sintered in a sintering process, the preparation of the positive electrode active material may be difficult. The Li, for example, may be included in an amount satisfying 1.0≤a≤1.15, in consideration of balance between a significant capacity characteristics improvement effect due to the control of the amount of the Li and sinterability during the preparation of the active material.

Furthermore, in the lithium transition metal composite oxide of Formula 1, Ni may be included in an amount corresponding to 1−x−y, for example, 0.6≤1−x−y<1. Ni may more preferably be included in an amount satisfying 0.8≤1−x−y≤0.9. When the amount of the Ni in the lithium transition metal composite oxide of Formula 1 is 0.6 or more, since the amount of the Ni is sufficient to contribute to charge and discharge, high capacity may be achieved. In a case in which the amount of the Ni is less than 0.6, there may be a limitation in achieving high capacity, and, when the amount of the Ni is greater than 0.9, since an amount of Li, which is sufficient for contributing to the charge and discharge, may not be secured due to the substitution of a portion of Li sites with Ni, charge and discharge capacity may be reduced.

Also, in the lithium transition metal composite oxide of Formula 1, Co may be included in an amount corresponding to x, that is, 0≥x≤0.5. In a case in which the amount of Co in the lithium transition metal composite oxide of Formula 1 is greater than 0.5, efficiency of improving capacity characteristics may be reduced in comparison to a cost increase. The Co, for example, may be included in an amount satisfying 0.05≤x≤0.2, in consideration of the significant capacity characteristics improvement effect due to the inclusion of the Co.

Furthermore, in the lithium transition metal composite oxide of Formula 1, Mn may be included in an amount corresponding to y, that is, 0≤y≤0.5. If y in the lithium transition metal composite oxide of Formula 1 is greater than 0.5, output characteristics and capacity characteristics of the battery may be rather reduced.

Also, in the lithium transition metal composite oxide of Formula 1, the lithium transition metal composite oxide may be doped with another element, that is, M, in addition to the elements of Ni, Co, and/or Mn, to improve battery characteristics by controlling the distribution of the transition metal elements in the positive electrode active material. The M may specifically include at least one selected from the group consisting of Al, Zr, Ti, Mg, Ta, Nb, Mo, and Cr. The element of M may be included in an amount corresponding to z within a range in which characteristics of the positive electrode active material are not degraded, that is, 0≤z≤0.1.

The positive electrode active material according to an embodiment of the present invention may have a coating portion including a boron lithium oxide on surfaces of particles of the lithium transition metal oxide.

The coating portion may include $LiBO_2$ as the boron lithium oxide, and may further include $Li_2B_4O_2$ and/or $LiB_3O_5$. The coating portion may more preferably include $LiBO_2$ in an amount of 95 wt % or more, and may most preferably include $LiBO_2$ in an amount of 95 wt % to 99 wt %. If the coating portion includes $LiBO_2$ in an amount of 95 wt % or more, the positive electrode active material may have three peaks in the differential graph (ERC curve) based on pH titration analysis and may satisfy the condition that the y-axis (dpH/dml) value of the first peak, which appears when an x-axis value for the amount of the acid (HCl) added is minimum, among the three peaks is −1.0 or less. Even if the coating portion further includes boron lithium oxides of $Li_2B_4O_2$ and/or $LiB_3O_5$ instead of $LiBO_2$, when the amount of the $LiBO_2$ does not satisfies 95 wt % or more, only two peaks appear in the differential graph (ERC curve) based on pH titration analysis, or the positive electrode active material does not satisfy the condition that the y-axis (dpH/dml) value of the first peak among the three peaks is −0.1 or less. With respect to the positive electrode active material which has only two peaks in the differential graph (ERC curve) based on pH titration analysis, or does not satisfy the condition that the y-axis (dpH/dml) value of the first peak among the three peaks is −0.1 or less, the discharge capacity and output characteristics may be degraded, the chemical and thermal stability may be reduced, and the life characteristics may be degraded.

Also, the coating portion may include elemental boron (B) in an amount of 500 ppm or more, for example, 1,000 ppm to 2,000 ppm. In a case in which the amount of the elemental B is less than 500 ppm, the chemical and thermal stability may be reduced and the life characteristics may be degraded.

The positive electrode active material according to the embodiment of the present invention as described above may be prepared by mixing and heat treating the lithium transition metal oxide and a boron-containing compound.

The boron-containing compound may be a mixture of at least one selected from the group consisting of $H_3BO_3$, $B_2O_3$, $C_6H_5B(OH)_2$, $(C_6H_5O)_3B$, $[CH_3(CH_2)_3O]_3B$, $C_{13}H_{19}BO_3$, $C_3H_9B_3O_6$, and $(C_3H_7O)_3B$, and more preferably, a positive electrode active material, which has three peaks in the differential graph (ERC curve) based on pH titration analysis and satisfies the condition that the y-axis (dpH/dml) value of the first peak, which appears when the x-axis value for the amount of the acid (HCl) added is minimum, among the three peaks is −1.0 or less, may be prepared by using a mixture of at least two of the boron-containing compounds.

The boron-containing compound may be mixed in an amount of 500 ppm to 2,000 ppm, for example, 500 ppm to 1,100 ppm based on the amount of the elemental B relative to a total weight of the lithium transition metal oxide and may then be heat-treated. Also, a mixing ratio of the mixture of the two boron-containing compounds may satisfy a weight ratio of 0.5:9.5 to 9.5:0.5. As described above, since the coating portion is formed by using the boron-containing compound in an amount of 500 ppm to 2,000 ppm and by using the two boron-containing compounds so as to satisfy the mixing ratio thereof, a positive electrode active material, which has three peaks in the differential graph (ERC curve) based on pH titration analysis and satisfies the condition that the y-axis (dpH/dml) value of the first peak, which appears when the x-axis value for the amount of the acid (HCl) added is minimum, among the three peaks is −1.0 or less, may be prepared.

As described above, the lithium transition metal oxide and the mixture of the boron-containing compounds are dry mixed and then heat-treated. In this case, the positive electrode active material according to the embodiment of the present invention may be heat-treated at a temperature of 300° C. to 500° C., for example, 350° C. to 400° C.

In a case in which the heat treatment temperature is less than 300° C., the boron-containing compounds are not sufficiently melted, but remain on the lithium transition metal oxide, or a uniform coating layer may not be formed even if the boron-containing compounds are converted into a boron lithium oxide, and, in a case in which the heat treatment temperature is greater than 500° C., since a reaction occurs too quickly due to the high temperature, a uniform coating portion may not be formed on the surface of the lithium transition metal oxide, $LiBO_2$ may not be included in an amount of 95 wt % or more, and a large amount of $Li_2B_4O_2$ or $LiB_3O_5$ may be formed.

The positive electrode active material thus prepared may more preferably has three peaks in a differential graph (ERC curve) based on pH titration analysis when 10 g of the lithium transition metal oxide is analyzed by pH titration using 0.5 M HCl, wherein a y-axis (dpH/dml) value of the first peak, which appears when the x-axis value for the amount of the acid (HCl) added is minimum, among the three peaks is −1.0 or less, for example, −1.5 to −2.5. A lithium secondary battery having high capacity, high output, and excellent life characteristics may be achieved by preparing the lithium secondary battery using the positive electrode active material, which has three peaks in the differential graph (ERC curve) based on pH titration analysis and satisfies the condition that the y-axis (dpH/dml) value of the first peak is −1.0 or less, as described above.

According to another embodiment of the present invention, provided are a positive electrode for a lithium secondary battery and a lithium secondary battery which include the positive electrode active material.

Specifically, the positive electrode includes a positive electrode collector and a positive electrode active material layer formed on the positive electrode collector and including the positive electrode active material.

In the positive electrode, the positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the positive electrode collector to improve the adhesion of the positive electrode active material. The positive electrode collector, for example, may be used in various shapes such as that of a film, a sheet, a foil, a net, a porous body, a foam body, a non-woven fabric body, and the like.

Also, the positive electrode active material layer may include a conductive agent and a binder in addition to the above-described positive electrode active material.

In this case, the conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 1 wt % to 30 wt % based on a total weight of the positive electrode active material layer.

Furthermore, the binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 1 wt % to 30 wt % based on the total weight of the positive electrode active material layer.

The positive electrode may be prepared according to a typical method of preparing a positive electrode except that the above-described positive electrode active material is used. Specifically, a composition for forming a positive electrode active material layer, which includes the above-described positive electrode active material as well as selectively the binder and the conductive agent, is coated on the positive electrode collector, and the positive electrode may then be prepared by drying and rolling the coated positive electrode collector. In this case, types and amounts of the positive electrode active material, the binder, and the conductive are the same as those previously described.

The solvent may be a solvent normally used in the art, and may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the solvent may dissolve or disperse the positive electrode active material, the conductive agent, and the binder in consideration of a coating thickness of the slurry and manufacturing yield, and may allow to have a viscosity that may provide excellent thickness uniformity during the subsequent coating for the preparation of the positive electrode.

Also, as another method, the positive electrode may be prepared by casting the above-described composition for forming a positive electrode active material layer on a separate support and then laminating a film separated from the support on the positive electrode collector.

According to another embodiment of the present invention, an electrochemical device including the positive electrode is provided. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material. The negative electrode active material layer, for example, may be prepared by coating a composition for forming a negative electrode, which includes the negative electrode active material as well as selectively the binder and the conductive agent, on the negative electrode collector and drying the coated negative electrode collector, or may be prepared by casting the composition for forming a negative electrode on a separate support and then laminating a film separated from the support on the negative electrode collector.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_x$ (0<x<2), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), fluoroethylene carbonate (FEC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be preferably used, and a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be more preferably used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1

Boron-containing compounds of $H_3BO_3$, $B_2O_3$, and $C_6H_5B(OH)_2$ were mixed with a lithium transition metal oxide of $Li(Ni_{0.8}Co_{0.1}Mn_{0.1})O_2$ in an amount of 1,100 ppm (based on B content) at a weight ratio of 9:0.5:0.5 using a dry mixer (CYCLOMIX, HOSOKAWA Micron Corporation) to obtain mixed powder. The obtained powder was heat-treated at 350° C. for 5 hours in an oxygen atmosphere. A positive electrode active material, in which a coating portion including a boron lithium oxide was formed on the surface of the $Li(Ni_{0.8}Co_{0.1}Mn_{0.1})O_2$, was obtained by the above method.

Example 2

A positive electrode active material was prepared in the same manner as in Example 1 except that, as boron-containing compounds, $H_3BO_3$ and $C_6H_5B(OH)_2$ were mixed in an amount of 1,100 ppm (based on B content) at a weight ratio of 9:1.

Comparative Example 1

A positive electrode active material was prepared in the same manner as in Example 1 except that a boron-containing compound was not mixed with the lithium transition metal oxide of $Li(Ni_{0.8}Co_{0.1}Mn_{0.1})O_2$ and a heat treatment was performed at 350° C.

Comparative Example 2

A positive electrode active material was prepared in the same manner as in Example 1 except that, as a boron-containing compound, $C_6H_5B(OH)_2$ was mixed in an amount of 1,100 ppm (based on B content).

Comparative Example 3

A positive electrode active material was prepared in the same manner as in Example 1 except that, as a boron-containing compound, $C_6H_5B(OH)_2$ was mixed in an amount of 1,100 ppm (based on B content) and a heat treatment was performed at 700° C. for 5 hours.

Comparative Example 4

A positive electrode active material was prepared in the same manner as in Example 1 except that, as a boron-containing compound, $H_3BO_3$ was mixed in an amount of 1,100 ppm (based on B content).

Experimental Example 1: pH Titration Analysis pH titration analysis was performed on the positive electrode active materials prepared in Examples 1 and 2 and Comparative Examples 1 to 4, and the results thereof are presented in FIG. 1. 10 g of the lithium transition metal oxide and 0.5 M HCl were used, and Mettler T5 was used as a pH meter.

Referring to FIG. 1, with respect to the positive electrode active materials of Examples 1 and 2, three peaks appeared in differential graphs (ERC curves) based on the pH titration analysis, and the positive electrode active materials of Examples 1 and 2 satisfied a condition that a y-axis (dpH/dml) value of the first peak appearing when an x-axis value for the amount of the acid (HCl) added was minimum, that is, the peak at an X-axis value of 5 to 10 was −1.0 or less. In contrast, with respect to the positive electrode active materials of Comparative Examples 1 to 4, it may be confirmed that only two peaks appeared in differential graphs (ERC curves) based on the pH titration analysis.

Experimental Example 2: ICP Analysis and Calculation of B Content by pH Titration Analysis Inductively coupled plasma (ICP) analysis was conducted to investigate the amount of elemental B included in the coating portion of each of the positive electrode active materials prepared in Examples 1 and 2 and Comparative Examples 1 to 4.

Specifically, after samples of the positive electrode active materials prepared in Examples 1 and 2 and Comparative Examples 1 to 4 were collected with a weight of about 0.05 g per sample in a vial and the weight thereof was precisely measured, 2 mL of hydrochloric acid and 0.5 mL of hydrogen peroxide were added thereto and each sample was completely dissolved by heating at 130° C. for 4 hours. When the sample was sufficiently dissolved, 0.1 mL of Internal STD(Sc) was added and diluted to 10 mL with ultrapure water. Thereafter, values measured by ICP analysis using an inductively coupled plasma-optical emission spectrometer (ICP-OES) (Perkin Elmer, OPTIMA 7300DV) are presented in Table 1 below.

Also, in order to confirm that the boron lithium oxide included in the coating portions of the positive electrode active materials prepared in Examples 1 and 2 and Comparative Examples 1 to 4 is $LiBO_2$, an amount of B was calculated by analyzing data obtained by pH titration. Specifically, assuming that the boron lithium oxide included in the coating portions was $LiBO_2$, the amount of B was calculated by using a molecular weight of $LiBO_2$, and the results thereof are presented in Table 1.

TABLE 1

| | Amount of boron-containing compound added (based on B content) (ppm) | B content (ICP) (ppm) | B content (pH titration analysis) (ppm) |
|---|---|---|---|
| Example 1 | 1,100 | 1,069 | 1,050 |
| Example 2 | 1,100 | 1,072 | 1,065 |
| Comparative Example 1 | — | — | — |
| Comparative Example 2 | 1,100 | 1,075 | — |
| Comparative Example 3 | 1,100 | 1,069 | — |
| Comparative Example 4 | 1,100 | 1,055 | — |

Referring to Table 1, with respect to Examples 1 and 2, the amount of B, which was calculated by analyzing the data obtained by pH titration and using the molecular weight of $LiBO_2$ assuming that the boron lithium oxide included in the coating portions was $LiBO_2$, was almost the same as the amount of B measured by ICP. As a result, it may be confirmed that most (95 wt % or more) of the boron lithium oxides included in the coating portions was $LiBO_2$.

In contrast, with respect to Comparative Examples 2 to 4, since only two peaks appeared during the pH titration analysis, it was not possible to analyze the amount of B by pH titration analysis.

Experimental Example 3: Battery Characteristics Evaluation

Each of the positive electrode active materials prepared in Examples 1 and 2 and Comparative Examples 1 to 4, a carbon black conductive agent, and a PVdF binder were mixed in a N-methylpyrrolidone solvent at a weight ratio of 95:2.5:2.5 to prepare a composition for forming a positive electrode active material layer, and one surface of an aluminum current collector was coated with the composition, dried at 130° C., and then rolled to prepare a positive electrode.

Also, natural graphite as a negative electrode active material, a carbon black conductive agent, and a PVdF binder were mixed in a N-methylpyrrolidone solvent at a weight ratio of 85:10:5 to prepare a composition for forming a negative electrode active material layer, and one surface of a copper current collector was coated with the composition to prepare a negative electrode.

An electrode assembly was prepared by disposing a porous polyethylene separator between the positive electrode and negative electrode thus prepared, and a lithium secondary battery was prepared by disposing the electrode assembly in a case, and then injecting an electrolyte solution into the case. In this case, the electrolyte solution was prepared by dissolving 1.0 M lithium hexafluorophosphate ($LiPF_6$) in an organic solvent composed of ethylene carbonate/dimethyl carbonate/ethylmethyl carbonate (mixing volume ratio of EC/DMC/EMC=3/4/3).

Figure 2:
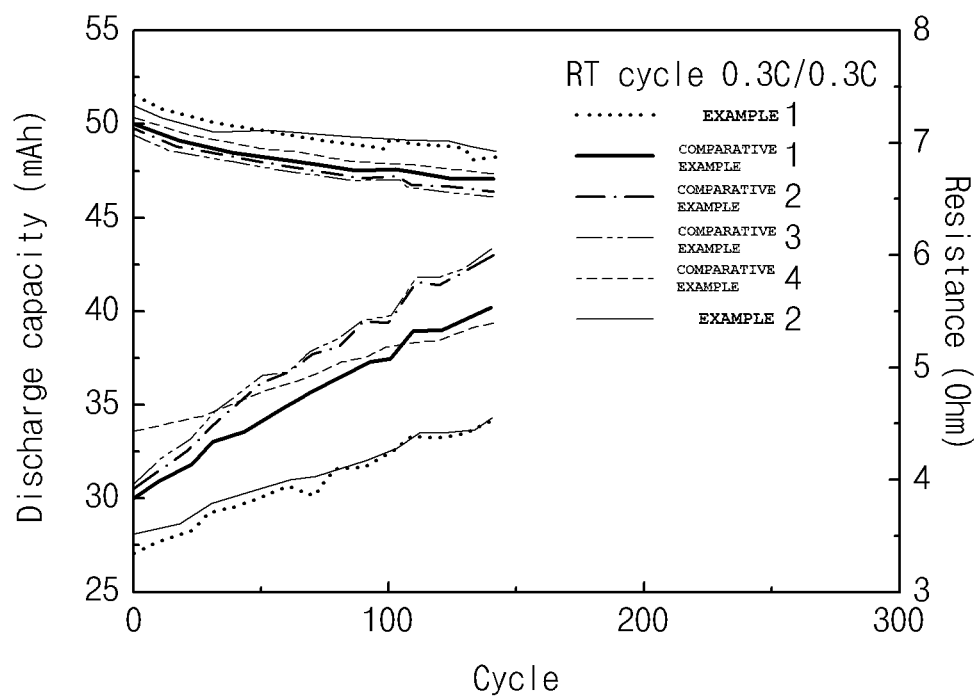
FIG. 2 is a graph evaluating life characteristics of secondary batteries including the positive electrode active materials prepared according to Examples and Comparative Examples.

Changes in capacity and changes in resistance were measured while 150 cycles of charge and discharge of the lithium secondary batteries thus prepared were performed under conditions including a charge end voltage of 4.25 V, a discharge end voltage of 2.5 V, and 0.3 C/0.3 C at 45° C., and the measurement results are illustrated in FIG. 2.

Referring to FIG. 2, it may be confirmed that Examples 1 and 2 had higher capacity retentions and lower resistance increase rates than Comparative Examples 1 to 4. That is, with respect to Examples 1 and 2 which had three peaks in the differential graphs (ERC curves) and satisfied the condition that the y-axis (dpH/dml) value of the first peak, which appeared when the x-axis value for the amount of the acid (HCl) added was minimum, was −1.0 or less, cycle characteristics were significantly better than those of Comparative Examples 1 to 4.

The invention claimed is:

1. A positive electrode active material for a secondary battery, comprising:
a lithium transition metal oxide,
wherein the positive electrode active material has three peaks in a differential graph obtained by differentiating a pH value against an amount of HCl added, which is obtained by pH titration of 10 g of the lithium transition metal oxide using 0.5 M HCl, wherein a y-axis value of a first peak at a smallest x-axis value among the three peaks is −1.0 or less,
wherein the lithium transition metal oxide has a coating portion comprising a boron lithium oxide on a surface of a particle of the lithium transition metal oxide, wherein the boron lithium oxide comprises $LiBO_2$, and
wherein the coating portion comprises the $LiBO_2$ in an amount of 95 wt % or more.

2. The positive electrode active material for a secondary battery of claim 1, wherein the y-axis value of the first peak is in a range of −1.5 to −2.5.

3. The positive electrode active material for the secondary battery of claim 1, wherein the coating portion comprises the $LiBO_2$ in an amount of 95 wt % to 99 wt %.

4. The positive electrode active material for a secondary battery of claim 1, wherein the coating portion comprises elemental boron (B) in an amount of 500 ppm or more.

5. The positive electrode active material for a secondary battery of claim 1, wherein the lithium transition metal oxide particle comprises at least one transition metal cation selected from the group consisting of cobalt (Co), nickel (Ni), and manganese (Mn).

6. The positive electrode active material for a secondary battery of claim 1, wherein the lithium transition metal oxide particle comprises at least one of a lithium cobalt oxide, a lithium nickel oxide, a lithium manganese oxide, a lithium iron phosphate compound, or a lithium transition metal composite oxide represented by Formula 1:

$$Li_aNi_{1-x-y}Co_xMn_yM_zO_2 \quad \text{[Formula 1]}$$

wherein, in Formula 1, M is at least one element selected from the group consisting of aluminum (Al), zirconium (Zr), titanium (Ti), magnesium (Mg), tantalum (Ta), niobium (Nb), molybdenum (Mo), and chromium (Cr), $0.9 \leq a \leq 1.5$, $0 \leq x \leq 0.5$, $0 \leq y \leq 0.5$, and $0 \leq z \leq 0.1$.

7. The positive electrode active material for a secondary battery of claim 6, wherein the lithium transition metal composite oxide represented by Formula 1 comprises nickel (Ni) in an amount of 60 mol % or more based on an amount of total transition metals.

8. A positive electrode for a secondary battery, the positive electrode comprising: the positive electrode active material of claim 1, a conductive agent, a binder, and a positive electrode collector.

9. A lithium secondary battery comprising: the positive electrode of claim 8, a negative electrode disposed to face the positive electrode, and a separator disposed between the positive electrode and the negative electrode.

* * * * *